Jan. 16, 1962 D. I. FINCH ET AL 3,017,269

COPPER-NICKEL THERMOCOUPLE ELEMENTS WITH CONTROLLED VOLTAGE TEMPERATURE CHARACTERISTICS

Filed May 4, 1959 3 Sheets-Sheet 2

Jan. 16, 1962 D. I. FINCH ET AL 3,017,269

COPPER-NICKEL THERMOCOUPLE ELEMENTS WITH CONTROLLED VOLTAGE TEMPERATURE CHARACTERISTICS

Filed May 4, 1959 3 Sheets-Sheet 3

United States Patent Office 3,017,269

Patented Jan. 16, 1962

3,017,269

COPPER-NICKEL THERMOCOUPLE ELEMENTS WITH CONTROLLED VOLTAGE TEMPERATURE CHARACTERISTICS

Donald I. Finch, North Woods, Edward Korostoff, Philadelphia, and Daniel D. Pollock, Lansdale, Pa., assignors to Leeds and Northrup Company, Philadelphia, Pa., a corporation of Pennsylvania Filed May 4, 1959, Ser. No. 810,609

8 Claims. (Cl. 75—159)

This invention relates to thermocouple elements composed of copper-nickel alloys.

Prior to the present invention, only a few constantans suitable for use as thermocouple elements were known. These few but widely used commercial constantans were essentially alloys of copper and nickel whose percentage composition of copper, nickel, manganese and iron was that empirically found to afford, with certain appropriate elements of iron, copper or Chromel, a thermocouple whose voltage/temperature characteristic would acceptably match established thermoelectric curves or tables such as published by the U.S. Bureau of Standards in its NBS Circular 561. Furthermore, such thermocouples had the shortcomings that when used in corrosive atmospheres (both oxidizing and reducing, especially when containing sulphur), their life was shortened by structural failure of the constantan element and that, before such structural failure, the accuracy of the temperature measurements was progressively degraded because of changes in the voltage/temperature characteristic of the constantan element.

The principal object of the present invention is to control the average slope and curvature of the voltage/temperature characteristic of a copper-nickel alloy by inclusion, essentially wholly in solid solution, of hereinafter specified control elements so to provide a large family of copper-nickel thermocouple alloys each having a reproducible stable voltage/temperature characteristic whose average slope and curvature can be preselected within a wide range. Included in such family are many copper-nickel alloys of various different compositions all preselected to have voltage/temperature characteristics which very closely match those of the aforesaid few previously used constantans and which additionally are enhanced corrosion-resistance: also included in such family are many copper-nickel alloys having different voltage/temperature characteristics preselected to complement those of an associated iron, copper or Chromel element reproducibly to obtain a predetermined voltage/temperature characteristic of the couple. In most cases, at least one of the control elements added to the copper-nickel base is selected to enhance the corrosion-resistance, and at least another of them is selected so that the control elements jointly effect the desired modification of the voltage/temperature characteristic of the copper-nickel base.

For a more detailed understanding of the invention, reference is made to the following description and to the accompanying drawings in which.

Figure 1:
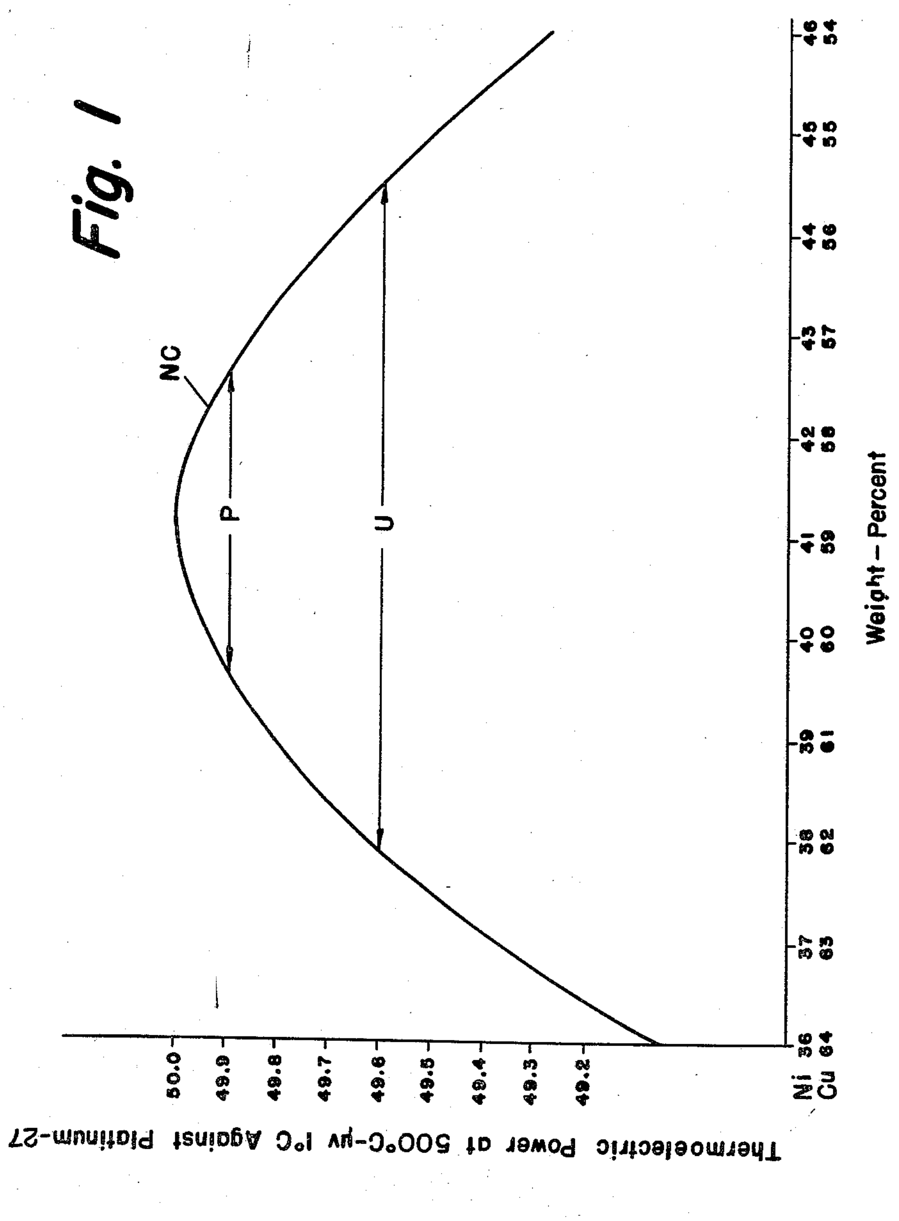
FIG. 1 is a curve representing the thermoelectric power of binary alloys of copper and nickel.

As a result of hundreds of experiments, we have found that starting from a copper-nickel base having a copper-nickel ratio which is essentially 60% copper and 40% nickel and adding small amounts of two or more additional alloying elements, specified in Table A below, that it is possible to produce a large group of copper-nickel alloys whose thermoelectric power may be controlled or preselected within a wide range (including that of the aforesaid commercial constantans), whose thermoelectric power is stable with time and temperature, and whose corrosion-resistance is equal to or greater than that of said commercial constantans.

The maximum to which any of the added control elements should appear in the final alloy was found to be limited by the percentage which would be in solid solution throughout the operating temperature range of the thermocouple. It was found that if such maximum amount is exceeded, the thermoelectric power of the alloy is not stable. To a first approximation, the percentage limits of solid solubility for the control elements are given in column III of Table A below.

TABLE A

| I<br>Control Element | II<br>Effect per percent of element in µv. (microvolts)[1] at 500° C. | III<br>Percent Limit of Solid Solubility [1] |
|---|---|---|
| Antimony (Sb) | 1,900 | 8 |
| Beryllium (Be) | 4,300 | 1 |
| Chromium (Cr) | 10,500 | 2 |
| Cobalt (Co) | 2,750 | 2 |
| Indium (In) | 540 | 3 |
| Iron (Fe) | 6,820 | 2 |
| Magnesium (Mg) | 1,870 | 2 |
| Manganese (Mn) | 1,900 | 15 |
| Molybdenum (Mo) | 8,000 | 2 |
| Niobium (Nb) | 6,000 | 2 |
| Silicon (Si) | 5,530 | 4 |
| Tantalum (Ta) | 2,700 | 5 |
| Tellurium (Te) | 900 | 1 |
| Tin (Sn) | 1,170 | 5 |
| Titanium (Ti) | 5,960 | 2 |
| Tungsten (W) | 3,800 | 2 |
| Vanadium (V) | 11,400 | 1 |
| Zirconium (Zr) | 600 | 3 |

[1] These figures represent first order approximations.

Limiting the amount of any control element of column I of Table A as added to a melt at alloying temperatures to a percentage less than the limit of its solid solubility does not inherently insure that essentially all of such additive will be in solid solution in the final thermocouple alloy which would not be the case if intergranular segregates were formed. To attain a preselected, stable and reproducible voltage temperature characteristic, it is necessary that the control element or elements go into solution in the melt at alloying temperature and remain in solid solution in the alloy as fabricated into thermocouple elements. Such solid solubility can be attained by known melting techniques, such as double deoxidation, or vacuum melting, and can be checked by such known methods of analysis as X-ray diffraction, metallographic examination, electron diffraction, chemical and microchemical As appears in column II of Table A, the inclusion of any of the above specified control elements of column I modifies to a predetermined extent the voltage/temperature characteristics of the copper-nickel base. When two or more of such elements are added to the base alloy, their individual effects upon such voltage/temperature characteristics are cumulative. Thus, up to the limit of their composite solid solubility in the final alloy, any number of these control elements may be included in percentages preselected to attain any one of many voltage/temperature characteristics which to a predetermined extent differs from that of the copper-nickel base.

The control elements having the most marked effect in improvement of corrosion-resistance of the copper-nickel base were found to be beryllium, chromium, indium, silicon, tin and titanium. The control elements found to have a moderate effect in improvement of corrosion-resistance were found to be cobalt, magnesium, manganese, molybdenum, niobium (columbium), tantalum, vanadium and zirconium.

The other elements listed in Table A do not appreciably affect the corrosion-resistance of the base alloy, but have been found to have a stable and reproducible effect upon the voltage/temperature characteristics of alloys formed by addition of any one or more of the corrosion-resisting elements to the copper-nickel base. Thus, up to the respective limits of their composite solid solubility in the final alloy, any number of these other control elements may be added to attain any one of many voltage/temperature characteristics which to a predetermined extent differ from that of the base alloy alone or in solid solution with any one or more of the corrosion-resisting elements.

To permit the maximum permissible addition of the elements of Table A for control of the corrosion-resistance and voltage/temperature characteristic with freedom from the effects of small but critical changes in the ratio of copper to nickel, the copper-nickel ratio in the base alloy must be held close to 60% copper and 40% nickel. As shown by curve NC of FIG. 1, this ratio is close to the one affording the maximum negative thermoelectromotive force vs. platinum* for a binary alloy of copper and nickel. Preferably, the copper-nickel ratio in the base alloy should closely approximate 60% copper/40% nickel, i.e. it should be in the P range of FIG. 1, from 60.5% copper/39.5% nickel to 57.5% copper/42.5% nickel. For the somewhat extended range U (FIG. 1), i.e., from 62% copper/38% nickel to 56% copper/44% nickel, it is possible to make many thermocouple alloys having preselected voltage/temperature characteristics, but the copper-nickel ratio must be rigidly held to a fixed value in this range. For copper-nickel ratios higher than or lower than range U, it is most difficult reproducibly to preselect the desired voltage/temperature characteristic of alloys including the control elements of Table A because of the marked effect thereon of small changes in the copper-nickel ratio of the base.

Figure 2:
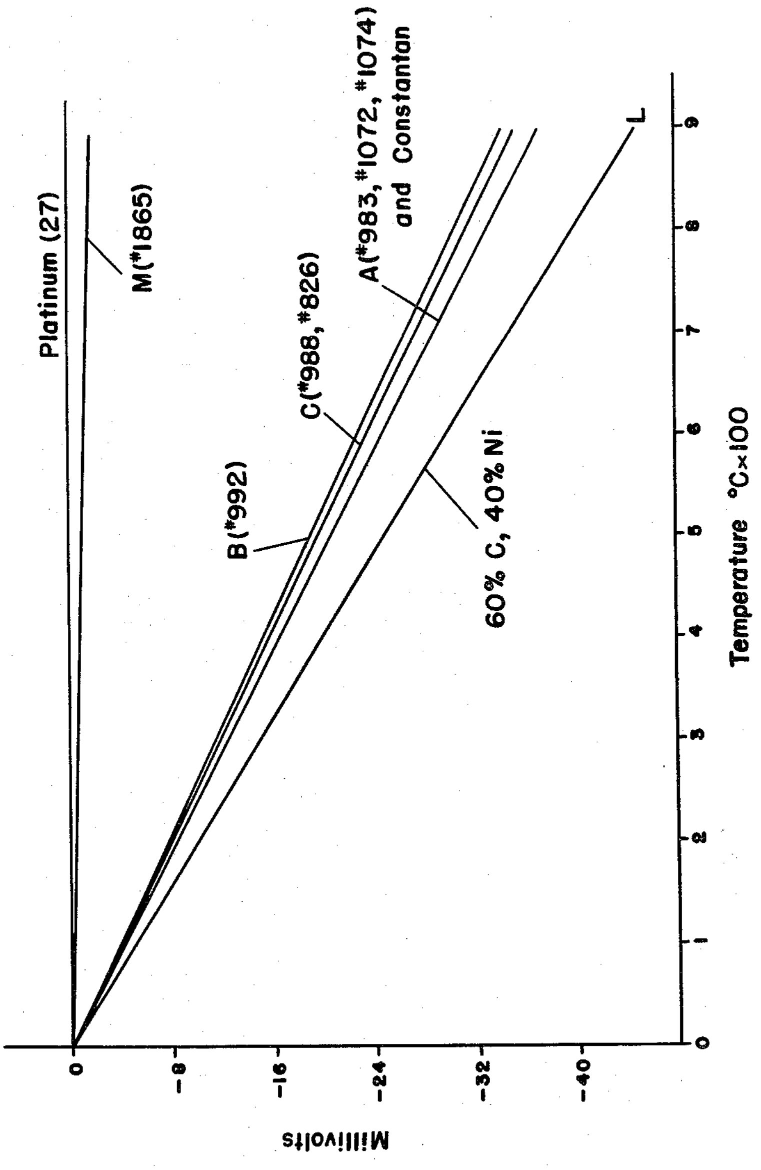
FIG. 2 is illustrative of the particular voltage/temperature characteristics of specific alloys embodying the invention.

As shown by curve L of FIG. 2, the average slope (as defined by the straight line through 0 and the 500° C. points) of the voltage/temperature curve of a thermocouple having the 60/40 copper-nickel base as one element and platinum as the other element is very close to —50 microvolts per degree C. (The precise value is —49.904 microvolts per degree C.) The effect of addition to the base alloy of any one or more of the control elements (column I of Table A) as to make the average slope of the voltage/temperature characteristic less negative or more positive with respect to platinum. The magnitude of such change can be closely predetermined from inspection of column II of Table A. For example, if the additives as appearing in the final alloy are 0.25% titanium, 0.20% silicon, 0.25% cobalt, the slope of the voltage-temperature curve of the resulting alloy against platinum becomes very close to —43.3 microvolts per degree C.

As appears from Table A, the various elements have different magnitudes of control effect upon the slope of the voltage/temperature characteristic for equal small additions, but since they vary in their limits of solubility in the copper-nickel base, an element having a small percent effect may nevertheless, because of its higher limit of solubility, be utilized in larger amounts greatly to modify the voltage/temperature characteristic of the base alloy. For example, it is pointed out that the presence of 1% vanadium in the final alloy has a much greater effect than 1% manganese, but because of its lower limit of solubility, vanadium can be used to produce a shift of only about 11,400 microvolts at 500° C., whereas manganese, because of its higher solubility, can be used to shift the voltage/temperature characteristic approaching 24,000 microvolts at that temperature. It is here to be noted that for a small addition of any one of the elements well within its limit of solid solubility, its effect on average slope of the voltage/temperature characteristics is substantially linear but for larger additions approaching its limit of solid solubility, its effect on average slope decreases. In other words, the effect per % addition is not strictly linear throughout the entire range of its solid solubility.

As appears from Table A and curve M of FIG. 2, manganese alone may be used to shift the slope of the voltage/temperature characteristic from approximately —50 microvolts per degree C. to —2.4 microvolts per degree C. This slope may be further increased in the positive direction by adding any one or more of the elements tabulated, each to the limit of its solid solubility in the final alloy. Thus, it becomes possible to make thermocouples both of whose thermoelectric elements are a 60/40 copper base but having different combinations and/or different percentages of control additives selected to impart to those thermocouple elements respective voltage/temperature characteristics having substantially different slopes as measured against platinum. Also, by the selection of the control additives as well as their percentages, it is possible to make a number of copper-nickel base alloys, any two of which when combined as a thermocouple will exhibit voltage/temperature characteristics the same as those of noble metal thermocouples, so that such combinations of alloys may serve as inexpensive extension leads for noble metal thermocouples without introduction of spurious thermally-produced voltages. Such uses of the new thermocouple alloys are in addition to their more usual use as thermocouple elements paired with elements of iron, copper or Chromel.

By recourse to the information complied in Table A, there may be preselected the percentages of corrosion-resisting elements which as included wholly in solid solution in the base alloy will provide thermocouple elements having preselected average slopes of their respective voltage/temperature characteristics in the range upwardly from —50 microvolts per dergee C.

All of the previously accepted thermocouple voltage/temperature curves deviate slightly from linearity: it is therefore necessary that these relatively small differences be considered when producing a new thermoelement to match established tables.

The voltage/temperature characteristic of the copper-nickel base is not precisely linear though appearing so as curve L of FIG. 2. The curvature or the deviation from exact linearity is shown as curve ID of FIG. 3 in which the voltage scale is greatly expanded and in which the average slope is represented by the horizontal line so designated.

Figure 3:
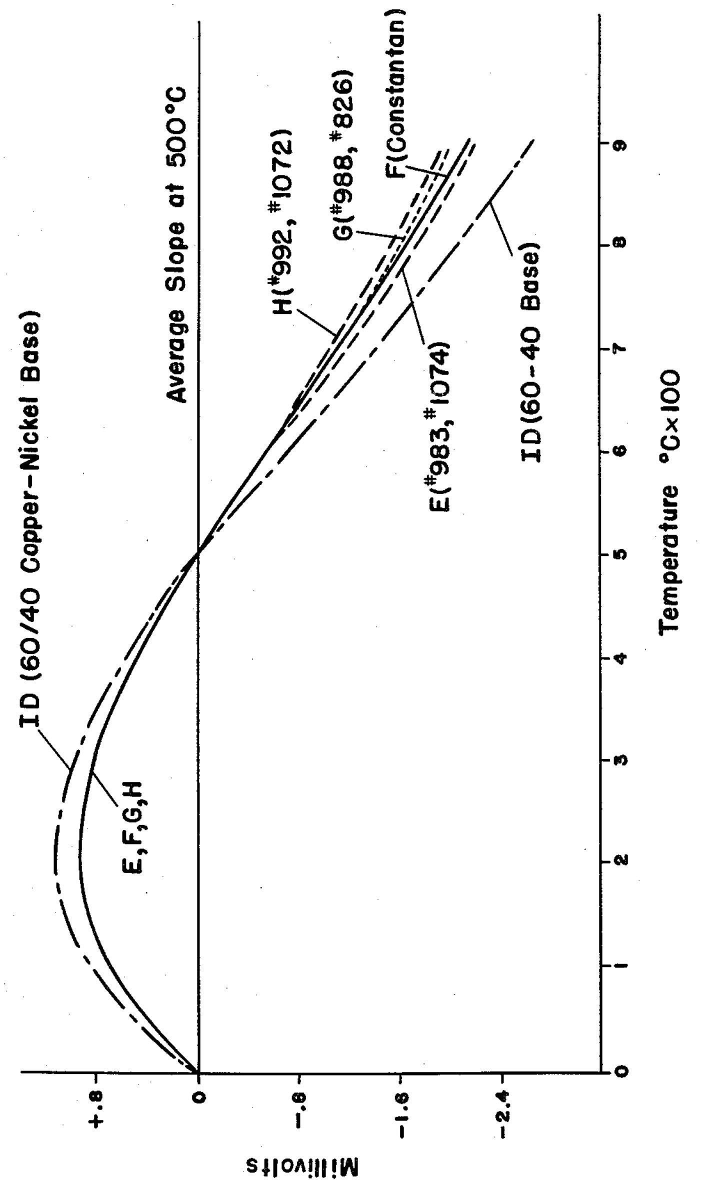
FIG. 3 is illustrative of the curvature deviations from the average slopes of the voltage/temperature characteristics of specified alloys embodying the invention.

The deviations from linearity for the copper-nickel base are given in millivolts in FIG. 3. This deviation can be controlled or modified by the addtion of any one of the control elements shown in Table B below. The percentage change in deviation of the copper-nickel base is used as a measure of the effect of any one element upon the curvature. Positive curvature correction is defined as that effect of an alloying element, in the copper-nickel base, upon the voltage/temperature relationship which tends to minimize the deviations from linearity of the average slope. Negative curvature correction may be defined as the accentuation of these deviations from linearity. The effect, upon curvature, of the individual elements varies both with the amount of the alloying element present in the copper-nickel base

* Platinum–27, herein designated as platinum, is an accepted reference established by the National Bureau of Standards (Washington, D.C.) as a basis for comparing the thermoelectric forces of thermocouple elements.

and with the temperature. For illustrative purposes, the approximate effects of a given amount (0.3% wt.) of each alloying element in the copper-nickel base are given for the temperature range 0 to 900° C. in Table B.

TABLE B

*Approximate curvature effects of 0.3% (wt.) of various alloying elements in the copper-nickel base over the temperature range 0 to 900° C.*

| Element | Effect |
|---|---|
| Antimony (Sb) | +5%. |
| Beryllium (Be) | +4%. |
| Chromium (Cr) | nil below 400° C.;—24% above 600° C. |
| Cobalt (Co) | —3% below 400° C.; —10% above 600° C. |
| Indium (In) | —2%. |
| Iron (Fe) | +10%. |
| Magnesium (Mg) | +3%. |
| Manganese (Mn) | +3%. |
| Molybdenum (Mo) | +16%. |
| Niobium (Nb) | +18%. |
| Silicon (Si) | +8%. |
| Tantalum (Ta) | +5%. |
| Tellurium (Te) | —3%. |
| Tin (Sn) | +2%. |
| Titanium (Ti) | +16%. |
| Tungsten (W) | +11%. |
| Vanadium (V) | +26%. |
| Zirconium (Zr) | —3%. |

A summary with respect to the relative degree of curvature correction is given in Table C below.

TABLE C

*Summary of approximate curvature effects for 0.3% (wt.) of the alloying elements in the copper-nickel base*

| Effect | Percent Curvature Range | Positive (+) | Negative (—) |
|---|---|---|---|
| Negligible | 0-2 | Mg, Sn | Cr (below 400° C.), In. |
| Small | 3-6 | Sb, Be, Mn, Ta | Co (below 400° C.),Te, Zr. |
| Moderate | 7-10 | Fe, Si | Co (above 600° C.). |
| Strong | 11-14 | W | |
| Very Strong | 15+ | Mo, Nb, Ti, V | Cr (above 600° C.). |

It is to be noted that an element having good corrosion protection properties does not necessarily have good curvature-correction effects. For example, if an element such as magnesium, which has little curvature-correction power, is added for increasing the corrosion-resistance, most of the curvature-correction must be made by another element such as titanium.

Starting with a 60/40 copper-nickel base having a slope closely approximating —50 microvolts per degree C., it has been found possible to make a multitude of copper-nickel thermocouple alloys having practically any desired slope characteristic and to so adjust or control the curvature as to include many new thermocouple alloys which match the voltage/temperature characteristics of the few previously used commercial constantans. As examples of specific thermocouple alloys whose different percentage compositions and components have been selected to obtain voltage/temperature characteristics which both as to slope and curvature very closely match (i.e., within ±½%) prior established thermoelectric curves and tables, reference is made of curve A of FIG. 2, to curves E, F, G, H of FIG. 3 and to alloys #983, #1072 and #1074 of Table D below. In many instances, matching within plus or minus 1% is acceptable.

TABLE D

| Element | #983 | #992 | #1072 | #1074 | #826 | #988 | #1865 |
|---|---|---|---|---|---|---|---|
| | *Percent* | *Percent* | *Percent* | *Percent* | *Percent* | *Percent* | *Percent* |
| Copper (Cu) | 59.27 | 58.01 | 59.33 | 59.33 | 58.30 | 59.15 | 49.77 |
| Nickel (Ni) | 39.39 | 38.14 | 39.22 | 39.41 | 38.86 | 39.43 | 33.18 |
| Antimony (Sb) | nil | nil | nil | nil | 2.45 | nil | nil |
| Cobalt (Co) | .16 | .24 | .28 | .22 | .30 | .30 | .03 |
| Indium (In) | nil | 2.9 | .47 | .51 | nil | nil | nil |
| Iron (Fe) | .02 | .02 | .02 | .03 | .03 | .03 | .02 |
| Magnesium (Mg) | nil | nil | nil | nil | nil | .58 | nil |
| Manganese (Mn) | nil | nil | nil | nil | nil | nil | 17. |
| Niobium (Nb) | nil | .39 | .40 | nil | nil | .15 | nil |
| Silicon (Si) | .28 | nil | nil | .34 | nil | nil | nil |
| Tin (Sn) | .61 | nil | nil | nil | nil | nil | nil |
| Titanium (Ti) | .26 | .26 | .26 | .28 | nil | .30 | nil |
| Vanadium (V) | nil | nil | nil | nil | nil | nil | nil |
| E.m.f Curves Slope | A (Fig. 2) | B (Fig. 2) | A (Fig. 2) | A (Fig. 2) | C (Fig. 2) | C (Fig. 2) | ---------- |
| Curvature | E (Fig. 3) | H (Fig. 3) | H (Fig. 3) | E (Fig. 3) | G (Fig. 3) | G (Fig. 3) | ---------- |
| Corrosion Resistance [1] | 1.4 | 4 | 1 | 2.7 | ---------- | 1 | ---------- |

[1] Life factor as referred to commercial thermocouple constantan.

As shown in Table D, the alloys #983, #1072 and #1074 are of different compositions but their voltage/temperature characteristics, as shown by curve A of FIG. 2, are essentially identical to each other and very closely match the prior established constantan vs. platinum table (see National Bureau of Standards RP2415, Table 2, column A–1). In FIG. 3, the departures from exact linearity have been plotted for each of these alloys on a greatly expanded voltage scale. As shown by curves (E—H) of FIG. 3, the voltage/temperature curves of alloys #983, #1072 and #1074 very closely match the above constantan vs. platinum table up to 600° C. Very small deviations of the voltages of these alloys occur at temperatures above 600° C.

Any of the above-mentioned three different alloys may be used interchangeably with each other or in replacement of previously used commercial constantan without need for recalibration of the scales of associated temperature-measuring instruments. Also as indicated in Table D, alloys #983 and #1074 afford substantially increased thermocouple life as compared with the previously used commercial constantans. In general, these and other alloys of compositions preselected to replace commercial constantan which have equal or enhanced corrosion-resistance include three or more of the elements of Table A and the total percentage of the control elements included in the 60/40 copper-nickel base is usually less than 2% and in all cases is less than 5%. Alloys containing only two of the control elements cannot ordinarily concurrently provide both enhanced corrosion-resistance and a voltage/temperature characteristic matching that of the commercial constantans.

Two of the other alloys of Table D, i.e., alloys #988 and #826 are exemplary of alloys of still different compositions preselected to provide voltage/temperature characteristics which are essentially similar to one another but to a preselected extent different from that of the previously used commercial constantans. Curve C of FIG. 2 is the voltage/temperature characteristic of these alloys. The curvature of their characteristics is so small as to be unnoticeable on the voltage scale of FIG. 2; hence, in FIG. 3 the departures from exact linearity for each of the alloys have been plotted on a greatly expanded voltage scale. As indicated by curve G of FIG. 3, the voltage/temperature characteristics of these alloys are very closely matched to each other over the temperature range from 0 to 900° C. It is also to be noted in Table D that the corrosion-resistance of alloy #992 is four times that of commercial constantan so that it is well suited for long use in highly corrosive atmospheres such as those containing $SO_2$ and $H_2S$.

From the particular examples of Table D, curves A–C of FIG. 2 and curves E–H of FIG. 3, it shall be understood that many other thermocouple alloys having preselected, stable voltage/temperature curves may be made by the addition of usually three or more control elements of Table A to the 60/40 copper-nickel base. In general, one or more of the control additives are selected from the group beryllium, chromium, indium, silicon, tin and titanium previously identified as markedly enhancing the corrosion-resistance, and the other added control element or elements are selected anywhere from Table A to adjust the slope and curvature of the matrix which includes the copper-nickel base alloy and the corrosion-resistant additives. The large number of control elements included in Table A insures that a preselected response curve can be obtained even though one or more of said elements may become commercially unavailable because of restriction at the source of supply or under Government Regulations during emergency conditions. Within the limits of solid solubility in the final alloy, relatively wide variations in each of the added control elements may be made to adjust the average slope and curvature of the voltage/temperature characteristics. Relatively wide variation in percentage inclusion of each of the added control elements may also be made to maintain or enhance corrosion-resistance while maintaining an essentially unchanged voltage/temperature characteristic. In all cases, the total amount of control elements, including residuals, should not be in excess of that insuring their solid solubility in the thermocouple alloy throughout the operating temperature range; and the amounts of the control elements are such that the algebraic sum of their effects upon the thermoelectric power of the base alloy is substantially equal to the difference between the thermoelectric power of the base alloy and that desired after addition of control elements selected from Table A.

This application is a continuation-in-part of our copending application Serial No. 666,652, filed June 19, 1957, now abandoned.

What is claimed is:

1. A corrosion-resistant thermocouple element having against platinum a stable voltage/temperature characteristic whose average slope is —41.5 microvolts per degree centigrade within tolerance limits of plus and minus 1% and which consists of an alloy composed of the control elements titanium, silicon, tin, iron and cobalt totaling not more than 5%, said titanium, silicon and tin being present in at least minimum amounts effective to increase corrosion resistance, said iron and cobalt being present in at least minimum amounts effective to decrease the E.M.F. a predetermined extent, and the remainder essentially being a copper-nickel base having a copper-nickel ratio closely approximating 60% copper, 40% nickel, said control elements being essentially wholly in solid solution in the copper-nickel base.

2. A corrosion-resistant thermocouple element having against platinum a stable voltage/temperature characteristic whose average slope is —41.5 microvolts per degree centigrade and which consists of an alloy whose composition is substantially 0.26% titanium, silicon 0.28%, tin 0.61%, iron 0.02%, cobalt 0.16%, and the remainder essentially being a copper-nickel base having a copper-nickel ratio closely approximating 60% copper, 40% nickel, said titanium, silicon, tin, iron and cobalt being essentially wholly in solid solution in the copper-nickel base.

3. A corrosion-resistant thermocouple element having against platinum a stable voltage/temperature characteristic whose average slope is —41.5 microvolts per degree centigrade within tolerance limits of plus and minus 1%, and which consists of an alloy composed of the control elements titanium, silicon, indium, iron and cobalt totaling not more than 5%, said titanium, silicon and indium being present in at least minimum amounts effective to increase corrosion resistance, said iron and cobalt being present in at least minimum amounts effective to decrease the E.M.F. a predetermined extent, and the remainder essentially being a copper-nickel base having a copper-nickel ratio closely approximating 60% copper, 40% nickel, said control elements being essentially wholly in solid solution in the copper-nickel base.

4. A corrosion-resistant thermocouple element having against platinum a stable voltage/temperature characteristic whose average slope is —41.5 microvolts per degree centigrade and which consists of an alloy whose composition is substantially titanium 0.28%, silicon 0.34%, indium 0.51%, iron 0.03%, cobalt 0.22%, and the remainder essentially being a copper-nickel base having a copper-nickel ratio closely approximating 60% copper, 40% nickel, said titanium, silicon, indium, iron and cobalt being essentially wholly in solid solution in the copper-nickel base.

5. A corrosion-resistant thermocouple element having against platinum a stable voltage/temperature characteristic whose average slope is —38.5 microvolts per degree centigrade and which consists of an alloy whose composition is titanium 0.26%, indium 2.9%, niobium 0.39%, iron 0.02%, cobalt 0.24%, and the remainder being essentially a copper-nickel base having a copper-nickel ratio closely approximating 60% copper, 40% nickel, said titanium, indium, niobium, iron and cobalt being essentially wholly in solid solution in the copper-nickel base.

6. A thermocouple element consisting of an alloy essentially comprising a copper-nickel base whose copper-nickel ratio approximates 60% copper, 40% nickel and having a stable voltage/temperature characteristic which differs from that of the copper-nickel base to extent predetermined by inclusion in the alloy, essentially all in solid solution and not in excess of limits of solid solubility, of at least two control elements selected from and in percentage determinable from the table below, at least one of said control elements being selected from the first group of the table consisting of beryllium, chromium, indium, silicon, tin and titanium and in an amount sufficiently effective to increase corrosion-resistance, and the other of said control elements being selected from the sceond group of the table consisting of antimony, cobalt, iron, magnesium, manganese, molybdenum, niobium, tantalum, tellurim, tungsten, vanadium and zirconium and in an amount sufficiently effective to make the voltage/temperature characteristic of said thermocouple element less negative with respect to platinum to a predetermined extent from the voltage/temperature characteristic of the copper-nickel base:

| | Control Element | Effect per percent of element in microvolts at 500° C.[1] | Percent limit of solid solubility[1] |
|---|---|---|---|
| 1st Group | Beryllium | 4,300 | 1 |
| | Chromium | 10,500 | 2 |
| | Indium | 540 | 3 |
| | Silicon | 5,530 | 4 |
| | Tin | 1,170 | 5 |
| | Titanium | 5,960 | 2 |
| 2nd Group | Antimony | 1,900 | 8 |
| | Cobalt | 2,750 | 2 |
| | Iron | 6,820 | 2 |
| | Magnesium | 1,870 | 2 |
| | Manganese | 1,900 | 15 |
| | Molybdenum | 8,000 | 2 |
| | Niobium | 6,000 | 2 |
| | Tantalum | 2,700 | 5 |
| | Tellurium | 900 | 1 |
| | Tungsten | 3,800 | 2 |
| | Vanadium | 11,400 | 1 |
| | Zirconium | 600 | 3 |

[1] First order approximation.

7. A corrosion-resistant thermocouple element having against platinum a stable voltage/temperature characteristic whose average slope is −38.5 microvolts per degree centigrade within tolerance limits of plus and minus 1%, and which consists of an alloy composed of the control elements titanium, indium, niobium, cobalt and iron totalling not more than 5%, said titanium, indium and niobium being present in at least minimum amounts effective to increase corrosion resistance, said iron and cobalt being present in at least minimum amounts effective to decrease the E.M.F. a predetermined extent, and the remainder being essentially a copper-nickel base having a copper/nickel ratio closely approximating 60% copper, 40% nickel, said control elements being essentially wholly in solid solution in the copper/nickel base.

8. A thermocouple element consisting of an alloy essentially comprising a copper-nickel base whose copper-nickel ratio is within the range 62% copper/38% nickel to 56% copper/44% nickel and having a stable voltage/temperature characteristic which differs from that of the copper-nickel base to extent predetermined by inclusion in the alloy, essentially all in solid solution and not in excess of limits of solid solubility, of at least two control elements selected from and in percentage determinable from the table below, at least one of said control elements being selected from the first group of the table consisting of beryllium, chrominum, indium, silicon, tin and titanium and in an amount sufficiently effective to increase corrosion-resistance, and the other of said control elements being selected from the second group of the table consisting of antimony, cobalt, iron, magnesium, manganese, molybdenum, niobium, tantalum, tellurium, tungsten, vanadium and zirconium and in an amount sufficiently effective to make the voltage/temperature characteristic of said thermocouple element less negative with respect to platinum to a predetermined extent from the voltage/temperature characteristic of the copper-nickel base:

| | Control Element | Effect per percent of element in microvolts at 500° C.[1] | Percent limit of solid solubility[1] |
|---|---|---|---|
| 1st Group | Beryllium | 4,300 | 1 |
| | Chromium | 10,500 | 2 |
| | Indium | 540 | 3 |
| | Silicon | 5,530 | 4 |
| | Tin | 1,170 | 5 |
| | Titanium | 5,960 | 2 |
| 2nd Group | Antimony | 1,900 | 8 |
| | Cobalt | 2,750 | 2 |
| | Iron | 6,820 | 2 |
| | Magnesium | 1,870 | 2 |
| | Manganese | 1,900 | 15 |
| | Molybdenum | 8,000 | 2 |
| | Niobium | 6,000 | 2 |
| | Tantalum | 2,700 | 5 |
| | Tellurium | 900 | 1 |
| | Tungsten | 3,800 | 2 |
| | Vanadium | 11,400 | 1 |
| | Zirconium | 600 | 3 |

[1] First order approximation.

References Cited in the file of this patent

UNITED STATES PATENTS 2,224,573 Hunter ---------- Dec. 10, 1940
2,330,018 Van Wert ---------- Sept. 21, 1943
2,696,544 Wyckoff ---------- Dec. 7, 1954

UNITED STATES PATENT OFFICE

CERTIFICATE OF CORRECTION

Patent No. 3,017,269 January 16, 1962

Donald I. Finch et al.

It is hereby certified that error appears in the above numbered patent requiring correction and that the said Letters Patent should read as corrected below.

Column 1, line 45, after "are" insert -- of --; column 3, line 51, for "as" read -- is --; column 4, line 40, for "complied" read -- compiled --.

Signed and sealed this 4th day of September 1962.

SEAL)
'test:

NEST W. SWIDER
testing Officer

DAVID L. LADD
Commissioner of Patents